(12) United States Patent
Judka et al.

(10) Patent No.: US 10,970,411 B2
(45) Date of Patent: Apr. 6, 2021

(54) DATABASE PREFERENCE SHARING AND MANAGEMENT

(71) Applicant: International Business Machines Corporation, Armonk, NY (US)

(72) Inventors: Danielle Judka, Poughkeepsie, NY (US); Jeffrey E. Bisti, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 227 days.

(21) Appl. No.: 16/129,570

(22) Filed: Sep. 12, 2018

(65) Prior Publication Data
US 2020/0084217 A1 Mar. 12, 2020

(51) Int. Cl.
*G06F 21/62* (2013.01)
*H04L 29/06* (2006.01)
*H04L 9/06* (2006.01)

(52) U.S. Cl.
CPC ........ *G06F 21/6218* (2013.01); *H04L 9/0643* (2013.01); *H04L 63/0218* (2013.01); *H04L 63/08* (2013.01); *H04L 63/101* (2013.01); *H04L 63/102* (2013.01); *H04L 2209/38* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 9,807,105 B2 | 10/2017 | Cheng et al. | |
| 9,882,918 B1 | 1/2018 | Ford et al. | |
| 2017/0134412 A1 | 5/2017 | Cheng | |
| 2018/0015838 A1 | 1/2018 | Miftakhov et al. | |
| 2018/0061237 A1 | 3/2018 | Erickson et al. | |
| 2018/0096175 A1* | 4/2018 | Schmeling | G06Q 10/08 |
| 2018/0137503 A1 | 5/2018 | High et al. | |
| 2018/0311561 A1* | 11/2018 | Puzhevich | G06K 9/00496 |
| 2018/0324154 A1* | 11/2018 | Crabtree | H04L 63/0428 |
| 2019/0013932 A1* | 1/2019 | Maino | G06F 16/212 |
| 2019/0049966 A1* | 2/2019 | Poornachandran | G05B 15/02 |
| 2019/0271578 A1* | 9/2019 | Moeller | G06Q 10/087 |
| 2019/0272495 A1* | 9/2019 | Moeller | G01F 23/296 |
| 2019/0272496 A1* | 9/2019 | Moeller | G01F 23/2962 |
| 2019/0303853 A1* | 10/2019 | Cantrell | G06F 16/1824 |

(Continued)

FOREIGN PATENT DOCUMENTS

WO 2017153495 A1 9/2017

*Primary Examiner* — Bradley W Holder

(57) ABSTRACT

An example operation may include one or more of receiving, by a first blockchain node of a blockchain network, first sensor updates from one or more sensors associated with the first blockchain node and creating a blockchain transaction to store updated action defaults and validated sensor updates to the shared ledger. The example operation may also include one or more of receiving, by a second blockchain node of the blockchain network, second sensor updates from one or more sensors associated with the second blockchain node, reading the shared ledger to determine updated action defaults and validated sensor updates corresponding to the second sensor updates, and interacting with a device based on the updated action defaults and validated sensor updates. The first blockchain node includes a shared ledger and historical sensor data. The second blockchain node includes the shared ledger.

17 Claims, 14 Drawing Sheets

(56) References Cited

U.S. PATENT DOCUMENTS

2019/0377336 A1* 12/2019 Avery .................... H04L 67/12
2020/0034454 A1* 1/2020 Chamarajnager ..... H04L 9/0643
2020/0059363 A1* 2/2020 Lobo .................... H04L 9/0637

* cited by examiner

DATABASE PREFERENCE SHARING AND MANAGEMENT

TECHNICAL FIELD

This application generally relates to a database storage system, and more particularly, to database preference sharing and management.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by inability to vet, evaluate, and propagate user preference updates. As such, what is needed is a solution to overcome these significant drawbacks.

SUMMARY

One example embodiment provides a blockchain network that includes first and second blockchain nodes. The first blockchain node includes a shared ledger and historical sensor data. The second blockchain node includes the shared ledger. The first blockchain node is configured to receive first sensor updates from one or more sensors associated with the first blockchain node and create a blockchain transaction to store updated action defaults and validated sensor updates to the shared ledger. The second blockchain node is configured to receive second sensor updates from one or more sensors associated with the second blockchain node, read the shared ledger to determine updated action defaults and validated sensor updates that correspond to the second sensor updates, and interact with a device based on the updated action defaults and validated sensor updates.

Another example embodiment provides a method that includes one or more of receiving, by a first blockchain node of a blockchain network, first sensor updates from one or more sensors associated with the first blockchain node and creating a blockchain transaction to store updated action defaults and validated sensor updates to the shared ledger. The example operation may also include one or more of receiving, by a second blockchain node of the blockchain network, second sensor updates from one or more sensors associated with the second blockchain node, reading the shared ledger to determine updated action defaults and validated sensor updates corresponding to the second sensor updates, and interacting with a device based on the updated action defaults and validated sensor updates. The first blockchain node includes a shared ledger and historical sensor data. The second blockchain node includes the shared ledger.

A further example embodiment provides a non-transitory computer readable medium comprising instructions, that when read by a processor, cause the processor to perform one or more of receiving, by a first blockchain node of a blockchain network, first sensor updates from one or more sensors associated with the first blockchain node and creating a blockchain transaction to store updated action defaults and validated sensor updates to the shared ledger. The example operation may also include one or more of receiving, by a second blockchain node of the blockchain network, second sensor updates from one or more sensors associated with the second blockchain node, reading the shared ledger to determine updated action defaults and validated sensor updates corresponding to the second sensor updates, and interacting with a device based on the updated action defaults and validated sensor updates. The first blockchain node includes a shared ledger and historical sensor data. The second blockchain node includes the shared ledger.

DETAILED DESCRIPTION

Figure 1:
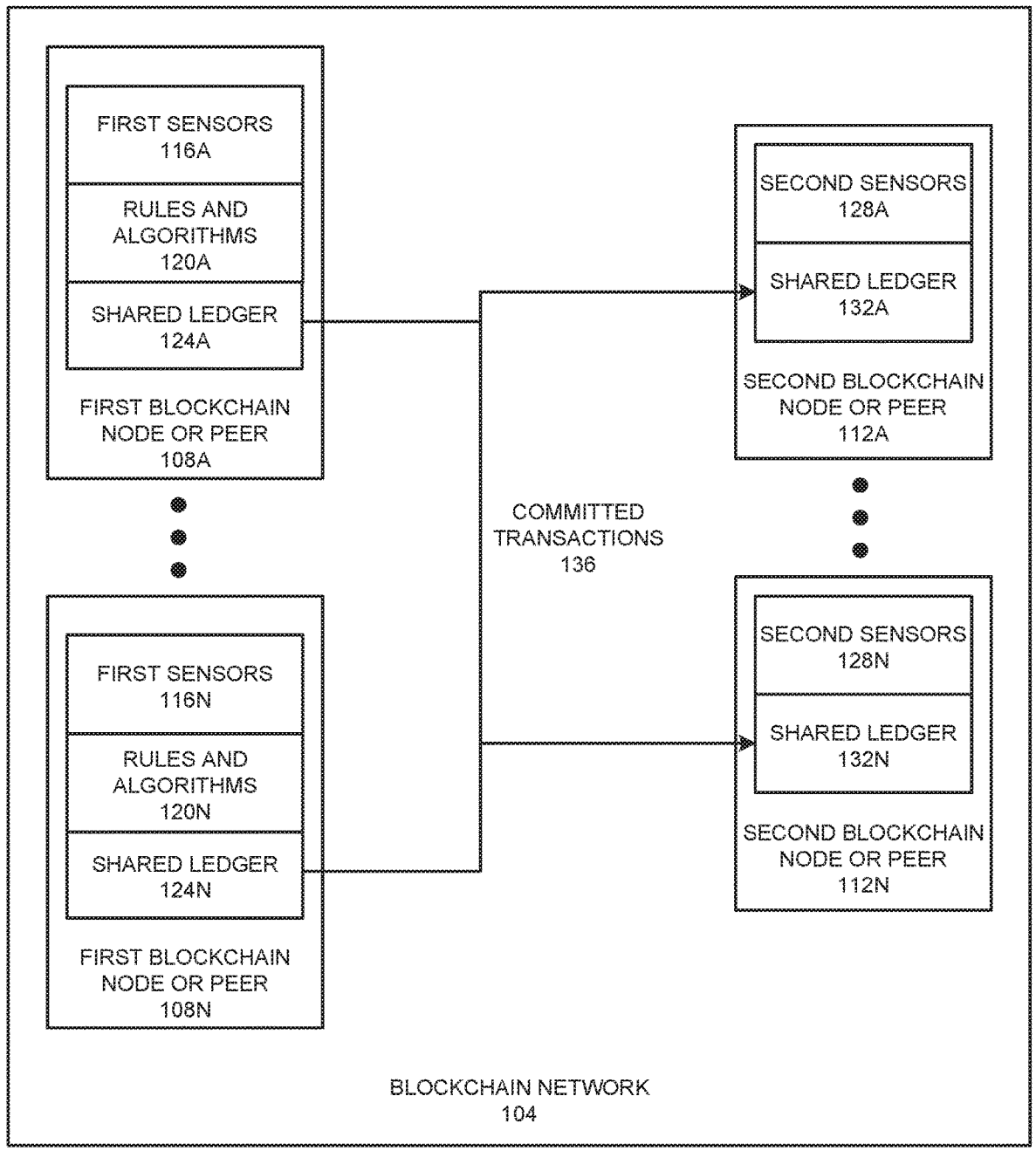
FIG. 1 illustrates a network diagram of a system including a database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide updates to user preferences based on licensed access to a shred ledger.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log; it can therefore be regenerated from the chain at any time. The state database may automatically be recovered (or generated if needed) upon peer node startup, and before transactions are accepted.

Some benefits of the instant solutions described and depicted herein include licensed distribution of refined user interface models while protecting core data used to create the user interface models. A company may spend large amounts of time and resources to develop highly customized customer-handling algorithms. It may be desirable to make the usage of those models licensable to other parties without turning over the core data behind the models, or methods used to arrive at a specific value present in the models. This allows for a leader in the autonomous user-facing solution industry to extend their usage to licensed third-parties without giving up control of their assets, while also benefitting from the usage in those controlled third-party instance. For examples, by benefitting from paid licenses.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the licensed and distributed customer interface models are implemented due to improved privacy, decentralized structures, and consensus, which are inherent and unique to blockchain. In particular, consensus between nodes may be important where the second-tier systems (i.e. licensees) may not be up to the standards of the first-tier systems (licensors). By leveraging permissioned blockchains, user data is hidden from unauthorized observations, and ensures the privacy of users. Additionally, certificates and SSL/TLS safeguards can be used to limit access.

One of the benefits of the example embodiments is that it improves the functionality of a computing system by improving validation of proposed updates. Through the blockchain system described herein, a computing system can perform functionality based on consensus because of blockchain. For traditional IT infrastructure and data storage, traditional approaches to storing data may be used. Blockchain beneficially distributes and provides certified access to the shared behavioral model data. Blockchain technology validates proposed updates before recording them on permanent media and policy updates.

The example embodiments provide numerous benefits over a traditional database. For example, through the blockchain the embodiments provide licensable user preference data, without exposing or giving away core data behind them. Meanwhile, a traditional database could not be used to implement the example embodiments because of excessive latencies and processing time. By employing a two-tier model, the present application allows for loosely-coupled usage and refresh of user preference data in a way that still protects the integrity of first-tier asset owners records. By pushing this stage of data processing out onto the blockchain nodes or peers, it reduces latency that would otherwise be caused by backend infrastructure and software processing times.

The example embodiments also change how data may be stored within a block structure of the blockchain. For example each transaction, which may ultimately become part of a block in a blockchain, contains a unique TXID (message or transaction identifier), an HMAC (hashed message authentication code), and a payload. These allow for the verification of the sender and payload. The payload contains the object identifier and the proposed update. For example, the object ID for User #123456's spoken language, and the modifications field, which contains the proposed update (ex: "English"). The present application describes the creation of a new, private blockchain network, and does not leverage publicly-used blockchain networks. While first-tier systems will use traditional majority voting rules to determine what gets accepted onto their collective blockchain, proposed updates from second-tier systems will be parsed for data, and evaluated for possible updates to the collective blockchain. It is likely that the majority or proposed updates from tier-two systems will not be accepted as written, but rather used in proprietary software models which will result in tier-one updates at a later time.

By storing the unique TXID (message identifier), the HMAC (hashed message authentication code), and the object identifier and the proposed update within data blocks of a blockchain, user preference updates for both first and second-tier systems may be appended to an immutable ledger through a hash-linked chain of blocks.

The present application addresses an original problem of multiple locations each having semi-autonomous robots in lobby areas that may look alike. People traveling from one location to another would see the robot and assume it was the same one, and also assume that they would be able to engage with it the same way they did the one they previously at a different location. The purpose is to create a sort of meshed network where the robots or kiosks can share this personalization information.

For most robotic platforms, there exists a standard model for human interaction, and personalization is based on deviations from that model. For example, one user may want to have a full conversation with a humanoid greeter, while another prefers to spend as little time interacting with a robot/kiosk as possible. Even information like the height of the user can help the robot/kiosk train cameras more accurately, where they will not become confused by people in the background.

An autonomous system can also train itself to improve its text-to-speech capabilities when working with accents and speech impairments. This may be valuable information that helps autonomous systems appear more natural, and give the appearance of learning and understanding. For Softbank Robotics systems, for example, facial and object recognition information is stored in a vision recognition database. On Apple devices, voice characteristics for SIRI are stored in a voice fingerprint, which along with history, aids with conversation context. IBM WATSON uses a JSON file which contains pairings and associations between phrases, subjects, and intents.

At the same time, a driving factor in autonomous systems is personalization, and delivering a unique or signature experience. It is imperative that the learned interaction characteristics be as loosely coupled to the programmed activities as possible. For this reason, these model deviations may be stored in a distributed or shared ledger, within a blockchain network. The present application describes a method of controlling who has access not only to read, but to update the shared ledger. Using voting algorithms, it is possible to interpret updates from autonomous systems as they learn more about their users. As companies create methods for better handling user data, this allows them to play a greater role in the forthcoming algorithm economy, marketing not only their hardware and software assets, but how they manage input from a large, distributed network of systems.

The algorithm economy is a market where an algorithm, or a model for handling data to predict a certain outcome, may be sold or licensed. For example, Netflix has an algorithm for predicting what movies a user will want to watch based on what they have already watched. A developer or group who takes that data and builds a better model that can predict with greater accuracy what a user will want may wish to license that model to Netflix. This type of trade and competition can be seen on websites such as Kaggle.com, where data scientists compete in developing models for money and jobs. This is different from just selling data or applications since it is selling a model which can be implemented by an application to handle data.

Without using a blockchain implementation, such a solution would rely on a singular centralized database for the tracking and distribution of this information. For a large enterprise, this is a non-trivial amount of information technology investment for something that is going to be entirely endpoint-driven. A traditional database solution also leads itself to security concerns, data integrity issues, as well as outright data loss. As the network grows, so does the strength and integrity of the system described herein. It acts as a sort of collective consciousness between all the autonomous systems in use.

The present application focuses on training robots, kiosks, or smart devices to be receptive to inputs, in addition to collectively utilizing remembered (stored) inputs. Collective information shared between robots/kiosks is stored into a centralized location. This location stores all the information gathered for the robots/kiosks, in addition to information about controlling the units and instructions. Uniquely, there is no centralized location for the robots/kiosks. These robots/kiosks have their programs installed on their individual chassis, and all information gathered is recorded in shared ledgers for others to acknowledge and reference. Instructions and controlling information for the robots/kiosks are installed onto the robots/kiosks specifically, so that their owners can specify what their individual robots/kiosks can do.

The present application utilizes blockchain technology to maintain a persistent shared ledger that removes the need for a centralized facility, thus reducing cost and maintenance. Robots/kiosks can function independently while the shared ledger records only the most essential events. This allows the robots/kiosks to be customizable and unique compared to other robots/kiosks, if needed, while still maintaining contact with the other robots/kiosks due to being notified of events in the shared ledger. The present application also removes the need for continuous backups and redundant servers, in addition to, reducing the IT personnel needed to maintain the blockchain.

FIG. 1 illustrates a network diagram of a system 100 including a database, according to example embodiments. Referring to FIG. 1, the network 100 includes a blockchain network 104. In the preferred embodiment, the blockchain network 104 is a permissioned blockchain network. However, in other embodiments, the blockchain network 104 may be a public blockchain network. However, public blockchain networks may potentially broadcast customer data to an unwanted third party, and are therefore less desirable than permissioned blockchain networks where all nodes or peers 108, 112 are trusted.

The blockchain network 104 includes one or more first blockchain nodes or peers 108, and one or more second blockchain nodes or peers 112. The first blockchain nodes or peers 108 are shown as first blockchain node or peer 108A through first blockchain node or peer 108N, and are autonomous systems owned and operated by the maintainer of the learned data and learning algorithms. They are capable of taking observed input (user preferences, learned behaviors, physical characteristics) and transforming them into updates which will help, in turn, produce more efficient, natural and pleasant user interactions in the future. They have not only access to their own copy of the shared ledger 124, but access to algorithms, rules, and historical data 120 that will allow them to make such a decision. For example, upon noticing a known user around dinner time, a default behavior may be to let the user know what local restaurants they may be interested in based on past interactions. If a user typically requests the closest Italian restaurant, but on one isolated interaction, asks for a closest Mexican restaurant instead, the algorithm will allow the system to make a determination as to whether the default should be updated, or some other action should be taken.

The second blockchain nodes or peers 112 are shown as second blockchain node or peer 112A through second blockchain node or peer 112N. The first blockchain nodes or peers 108 are part of a first tier of the blockchain network 104, while the second blockchain nodes or peers 112 are part of a second tier of the blockchain network 104 that subscribes or otherwise has membership to information selectively provided from the first tier. The membership may be controlled by any known means, including but not limited to a username, a password, a token, or a certificate. For example, second tier nodes or peers 112 not having a current subscription or membership would not receive the updates as described herein.

The first blockchain nodes or peers 108 are each associated with first sensors 116, identified as first sensors 116A associated with first blockchain node or peer 108A through first sensors 116N associated with first blockchain node or peer 108N. The first sensors 116 are associated with robots, kiosks, or smart devices that interact with users. The first blockchain nodes or peers 108 are each also associated with rules and algorithms 120, identified as rules and algorithms 120A associated with first blockchain node or peer 108A through rules and algorithms 120N associated with first blockchain node or peer 108N. The first blockchain nodes or peers 108 are each further associated with shared ledgers 124, identified as shared ledgers 124A associated with first blockchain node or peer 108A through shared ledgers 124N associated with first blockchain node or peer 108N.

As the owner and maintainer of the first tier systems 108 seeks to grow and expand their network 104, they will likely want to license their system to other service providers, as part of the algorithm economy. While they wish to extend the capabilities of their solution, they want to do so without giving away any secrets, formulas, rules, or algorithms that give them a competitive advantage. By granting a second-tier certificate to the licensees ($2^{nd}$ blockchain nodes or peers 112), users of the solution can have read access to the record of updates, and may also be permitted to propose their own updates based on user interactions.

The second blockchain nodes or peers 112 are each associated with second sensors 128, identified as second sensors 128A associated with second blockchain nodes or peers 112A through second sensors 128N associated with second blockchain nodes or peers 112N. The second blockchain nodes or peers 112 are each further associated with shared ledgers 132, identified as shared ledgers 132A associated with second blockchain nodes or peers 112A through shared ledgers 132N associated with second blockchain nodes or peers 112N.

The first blockchain nodes or peers 108 determine when to update the shared ledgers 124, 132 with updated action defaults, and issue committed transactions 136 to make the updates.

Figure 2A:
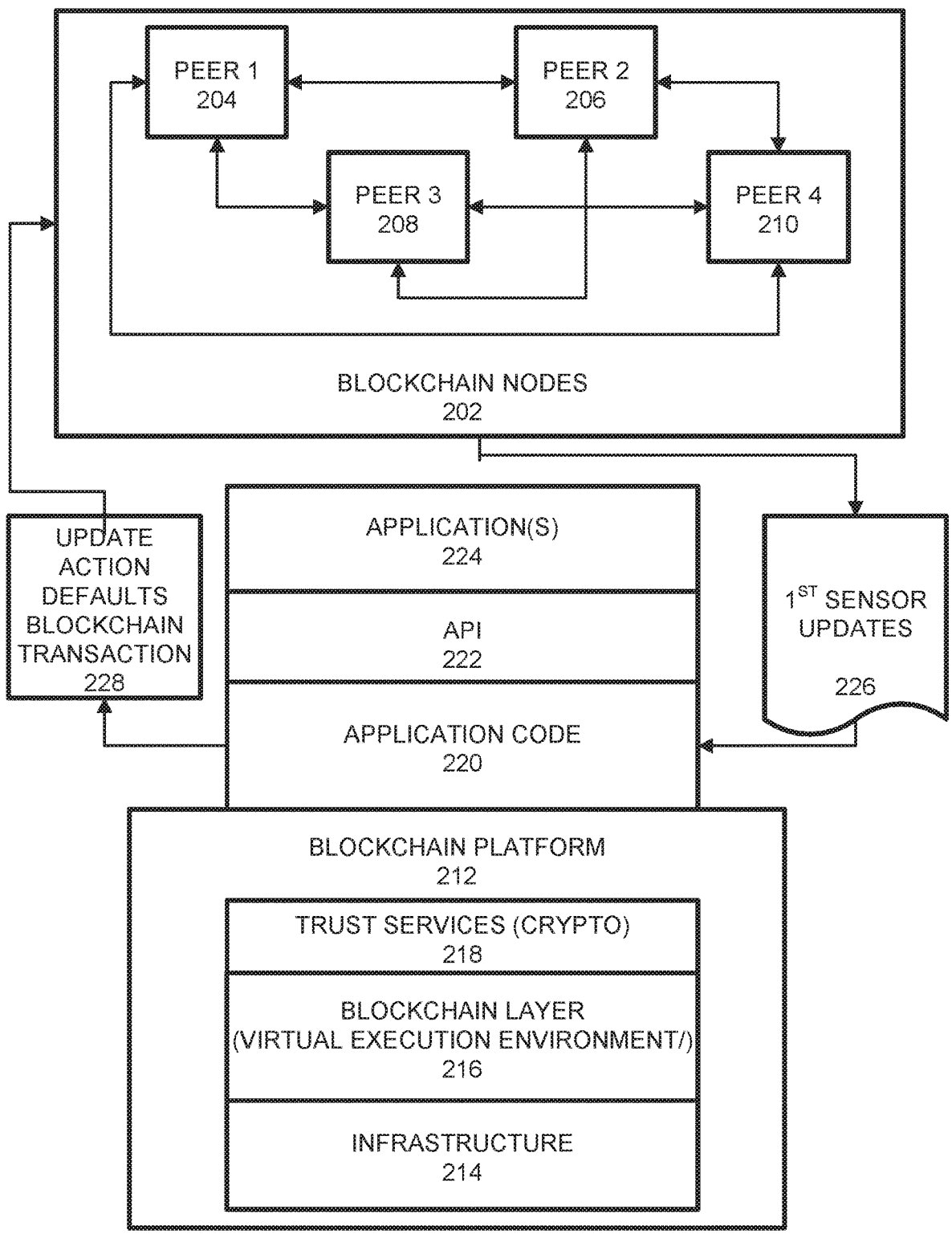
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226, $1^{st}$ sensor updates, may be processed by one or more processing entities (e.g., virtual machines) included in the blockchain layer 216. The result 228 may include updating action defaults to the shared ledger, through a blockchain transaction. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, $1^{st}$ sensor updates 226 are received by the blockchain platform 212. One function may be to update action defaults through a blockchain transaction 228, which may be provided to one or more of the nodes 204-210. The action defaults are updated to the shared ledger of the blockchain network, where they may later be used by $2^{nd}$ tier nodes or peers.

Figure 2B:
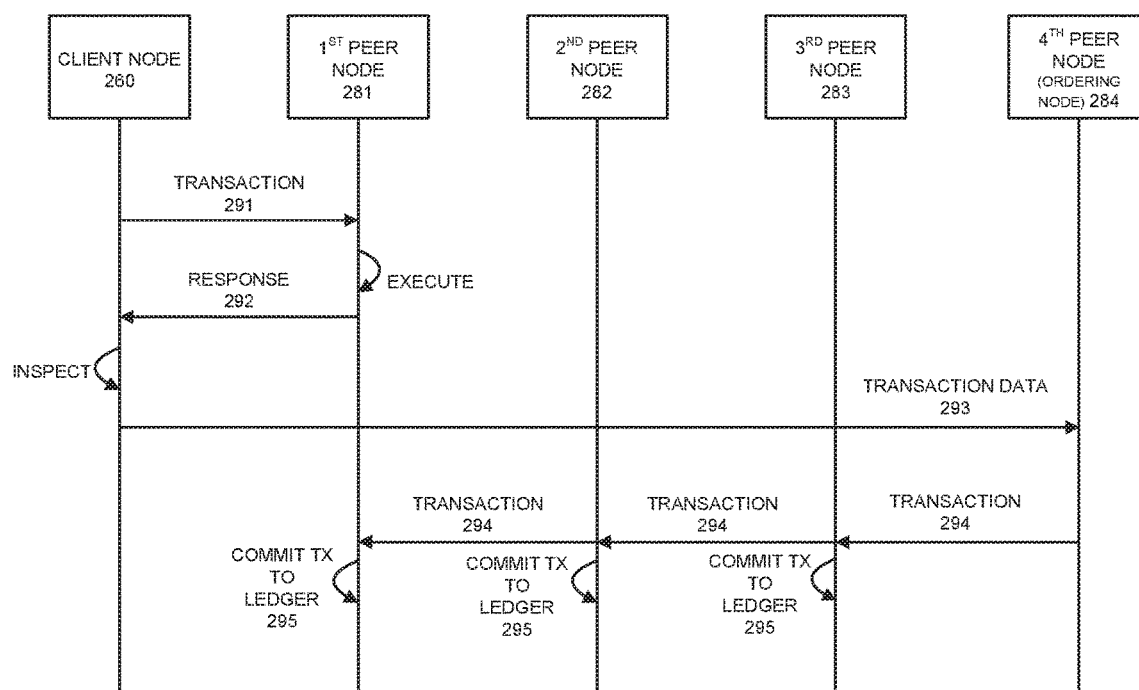
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
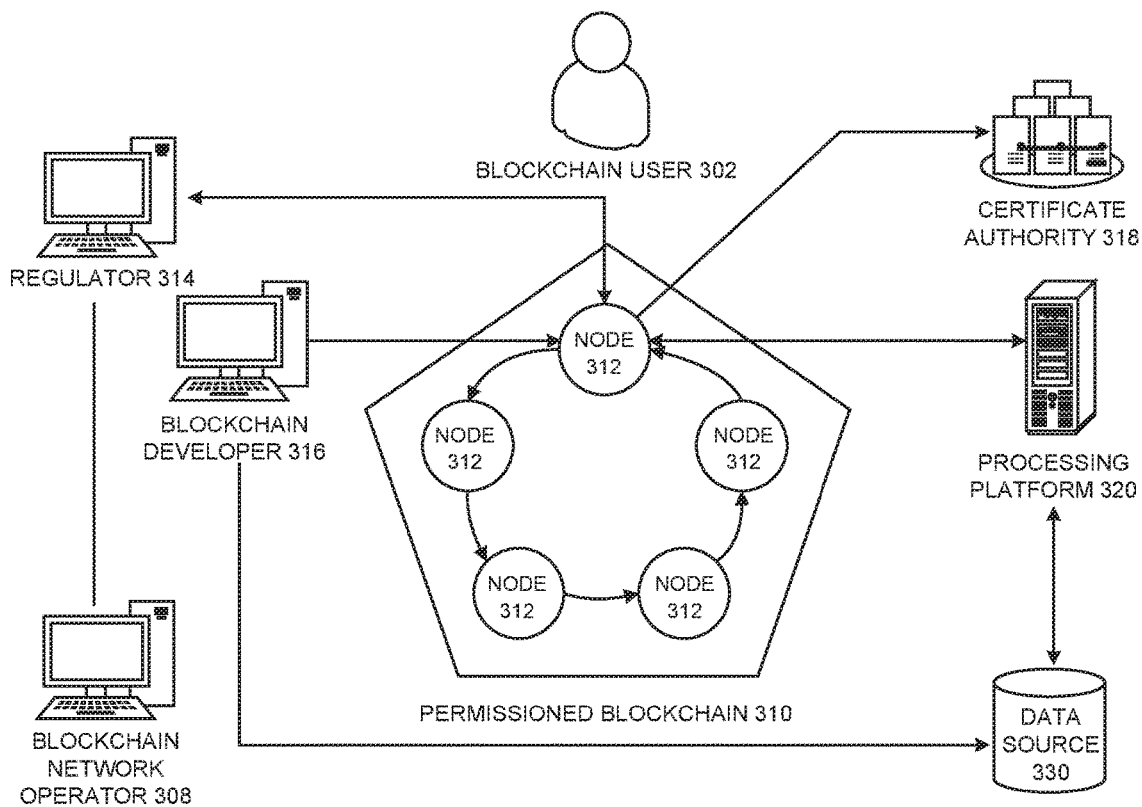
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
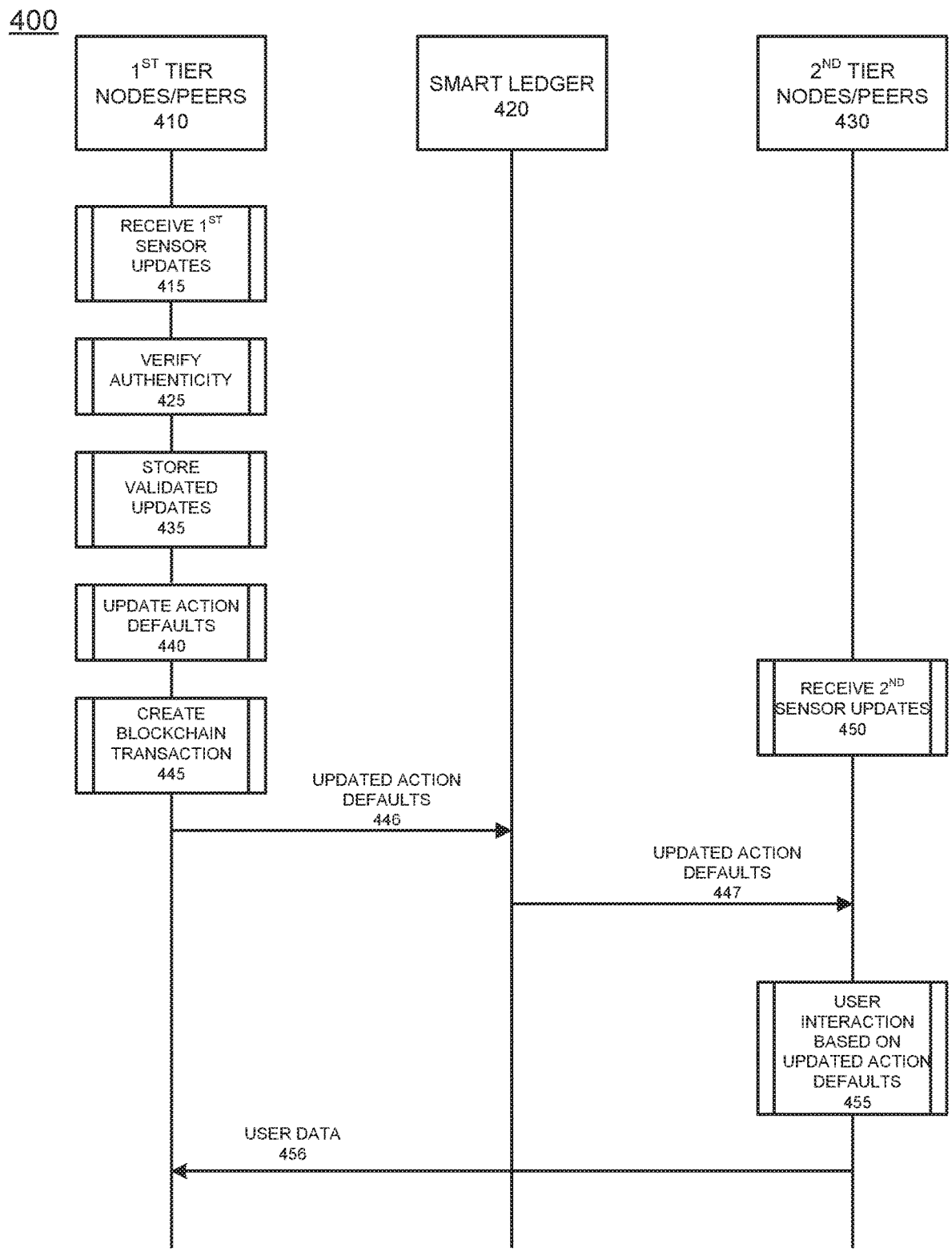
FIG. 4 illustrates a system messaging diagram for performing action default updating in a blockchain, according to example embodiments.

FIG. 4 illustrates a system messaging diagram for performing action default updating in a blockchain, according to example embodiments. Referring to FIG. 4, the system diagram 400 includes $1^{st}$ nodes or peers 410, smart ledgers 420, and $2^{nd}$ nodes or peers 430. Each of the $1^{st}$ nodes or peers 410, smart ledgers 420, and $2^{nd}$ nodes or peers 430 are part of a common blockchain network 104, which in the preferred embodiment is a permissioned blockchain network.

The $1^{st}$ nodes or peers 410 receive $1^{st}$ sensor updates 415 associated with the $1^{st}$ nodes or peers 410. Updates that are not verified or not important enough to warrant a blockchain transaction can be stored on first-tier systems ($1^{st}$ nodes or peers 410), or ignored, based on how the model is set up. Ideally, nothing is ever completely ignored, but may not result in an immediate update.

In response to receiving the 1st sensor updates 415, the 1st tier nodes or peers 410 verify authenticity of the 1st sensor updates 425. The ability to make decisions based on the 1st sensor updates 415 is based on the HMAC (hashed message authentication code, described previously) that accompanies the proposed update. The HMAC may be inspected to both verify the authenticity of the message and the source certificate.

Once the 1st sensor updates 415 authenticity has been verified 425, the 1st tier nodes or peers 410 store the validated sensor updates 435. In some embodiments, only actionable user information (preferences, mostly) would be held in the blockchain. Historical data, the rules themselves, and almost certainly the algorithms would be stored in other local storage, either on the nodes or peers themselves, or in central storage handled by a company's IT infrastructure.

Action defaults are maintained based on historical user behaviors and previous sensor data. The action defaults are updated 440 based on the validated sensor updates 425. These updated action defaults 440 may be stored locally to the 1st tier nodes or peers 410, stored to a local database associated with the blockchain network 104, or both.

At block 445, a blockchain transaction is created to store the updated action defaults 440 to the blockchain. The blockchain transaction 445 stores the updated action defaults 446 to the shared ledger 420. Once the updated action defaults 446 are stored to the shared ledger 420, other blockchain nodes or peers, including either 1st and 2nd tier nodes or peers 410, 430 are able to access the shared ledger 420 and retrieve the updated action defaults 440.

At block 450, a 2nd tier node or peer 430 receives 2nd sensor updates 450 from one or more sensors associated with the 2nd tier nodes or peers 430. The 2nd sensor updates 450 responsively cause the 2nd tier node or peer 430 to retrieve updated action defaults 447 from the shared ledger 420. The updated action defaults 447 direct the 2nd tier node or peer 430 to interact with a user associated with the 2nd sensor updates 450.

Based on retrieving the updated action defaults 447, the 2nd tier node or peer 430 interacts with the user associated with the 2nd sensor updates 455. As part of the user interaction, the 2nd tier node or peer 430 may receive new user data from the user, and in response provides the new user data 456 to the 1st tier nodes or peers 410.

In some embodiments, the 1st tier nodes or peers 410 store the user data 456. In other embodiments, the 1st tier nodes or peers 410 update one or more user profiles based on the user data 456. In yet other embodiments, the 1st tier nodes or peers 410 update action defaults 440 based on the user data 456.

Figure 5A:
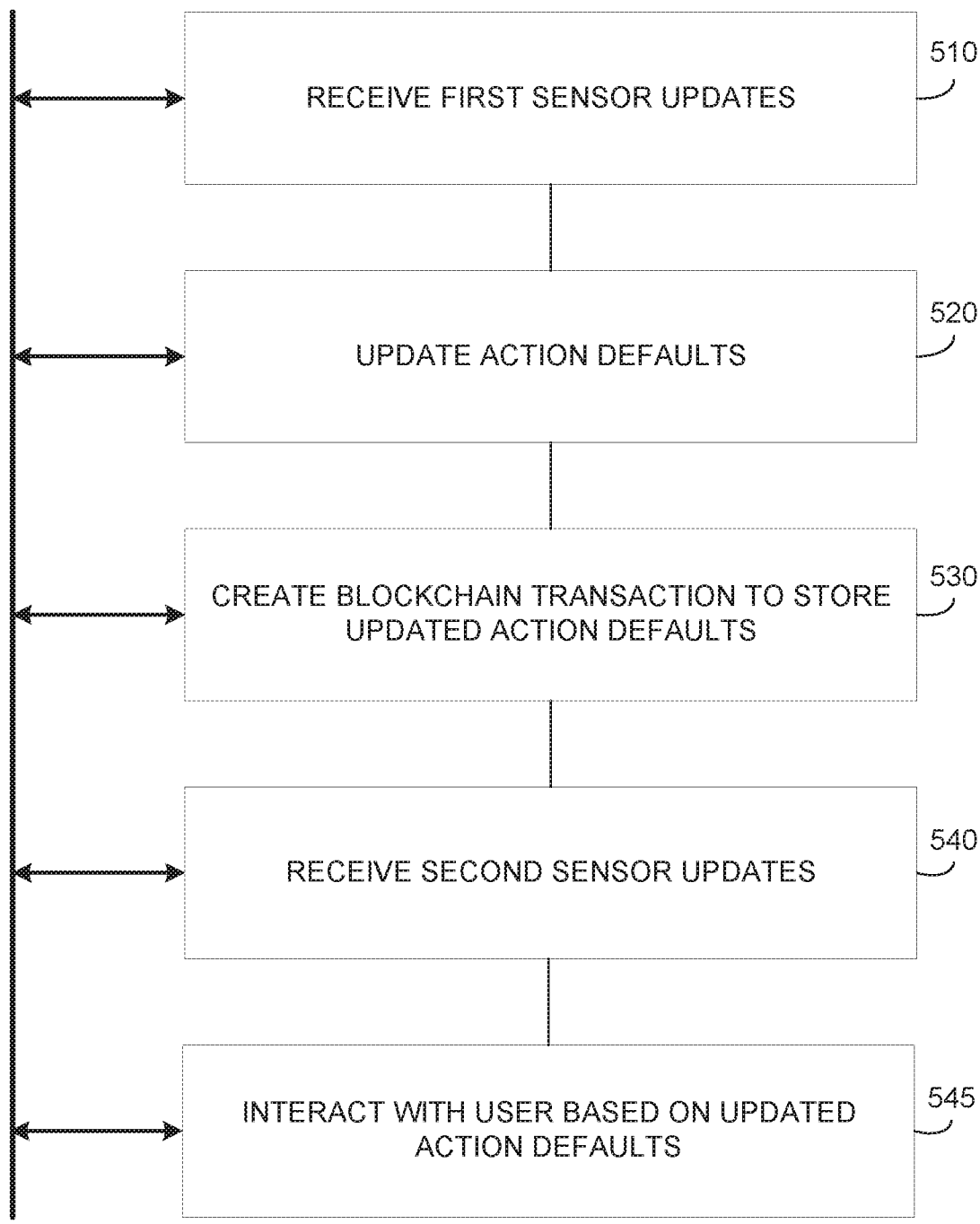
FIG. 5A illustrates a flow diagram of an example method of directing user interaction based on sensor updates in a blockchain, according to example embodiments.

FIG. 5A illustrates a flow diagram 500 of an example method of directing user interaction based on sensor updates in a blockchain, according to example embodiments. When deploying an autonomous or semi-autonomous solution to a location, being able to draw from past interactions and learned person data is paramount in creating a solution that users may easily interact with. For example, a hotel chain may want to use robots or kiosks in their lobby to greet guests and help assist with directions, or making dining and travel arrangements. The time that is spent interpreting the peculiarities and nuances of each guest's voice, face, and preferences should be shared between all robots/kiosks in the hotel chain's inventory, but this is difficult to implement while also trying to provide location-unique information and custom-tailored experiences and personalities for different locations.

Similarly, the owner of that hotel chain may wish to make that learned information available to others, extending the personalized experience, without giving away any other proprietary information or data. In short, it is difficult to provide full development freedom to the owners and maintainers of autonomous solutions without upsetting or hampering the sensitive nature of learned human interactions.

An autonomous robot or kiosk may be operated without significant human interaction. For example, an autonomous robot or kiosk that may be switched on at the beginning of the day and shut off at the end of the day, without needing to be guided by a human. This is in contract to a semi-autonomous robot/kiosk, which needs some help being correctly positioned, may require an assistant to prompt its users for the "correct" input, and is more of an assistant or novelty.

Referring to FIG. 5A, the method 500 may include receiving first sensor updates 510 by a 1st tier node or peer 108. The 1st tier node or peer 108 includes an application that could be any sort of application where the goal is to "recognize" a user, which could include robots, kiosks, and smart devices. The first sensor updates may include various data inputs as well as audio or video information.

The method 500 may also include updating action defaults 520. Whether an action default is worthwhile to be updated is part of the implementer's algorithm. For example, it is generally good practice to weight or pay more attention to more current user information than user information gathered some time ago. However, it would be unwise for a system to allow a user having a bad day or being in a rush one time to drastically influence their long-term profile. Going back to the Netflix/algorithm economy example, if a user typically watches westerns, but one night decides to watch a science fiction movie, that is information that should be recorded. However, Netflix may choose to not act upon that data unless the user keeps watching science fiction movies. That decision is part of what makes a good model, and the complexities of building that good model are what may make a company want to license a first-tier company's solution rather than building their own.

For First-tier nodes 108 (ex: a hotel autonomous kiosk), simply verifying that the message can be authenticated and verified by a majority of nodes (can be any percentage, set by the implementation) would be enough to grant the proposed action be taken. For a proposed update coming from a second-tier node 112 (ex: a local restaurant that partners a hotel) the first-tier nodes 108 will evaluate the update against their own models to see if it's worth accepting, and how to process it. For example, a hotel may trust its own kiosks 108 when a user decides to update their preferred language from English to German, but not a second-tier kiosk 112. That second-tier node 112 may gather information about the type of wine that their user ordered, and that information may be helpful in further refining a hotel's profile on that user, but the purpose of screening second-tier nodes 112 proposed updates is to control the integrity of the profile.

The method 500 may also include creating one or more blockchain transactions to store the updated action defaults 530 to a blockchain. Following consensus, the updated action defaults are stored to shared ledgers 124, 132 in newly committed blocks.

The method 500 may also include receiving 2nd sensor updates 540 from 2nd sensors associated with a 2nd tier blockchain node. The second sensor updates may include various data inputs as well as audio or video information.

Finally, the method 500 may also include interacting with a user based on the updated action defaults 545. Allowing the implementer of the first-tier 108 solution, which performs long-term cultivation of user preferences and personalization, to extend its profile of each user, to a licensed second-tier node or peer 112, where the licensee can know what type of product or service a user likes, is a unique intersection of business and technology. The reverse of that, allowing that second-tier nodes or peers 112 to feed observations back to the first-tier nodes or peers 108, where data is vetted and processed according to that solution's unique model, allows the implementer to improve their product in ways that they would not otherwise be able to.

Figure 5B:
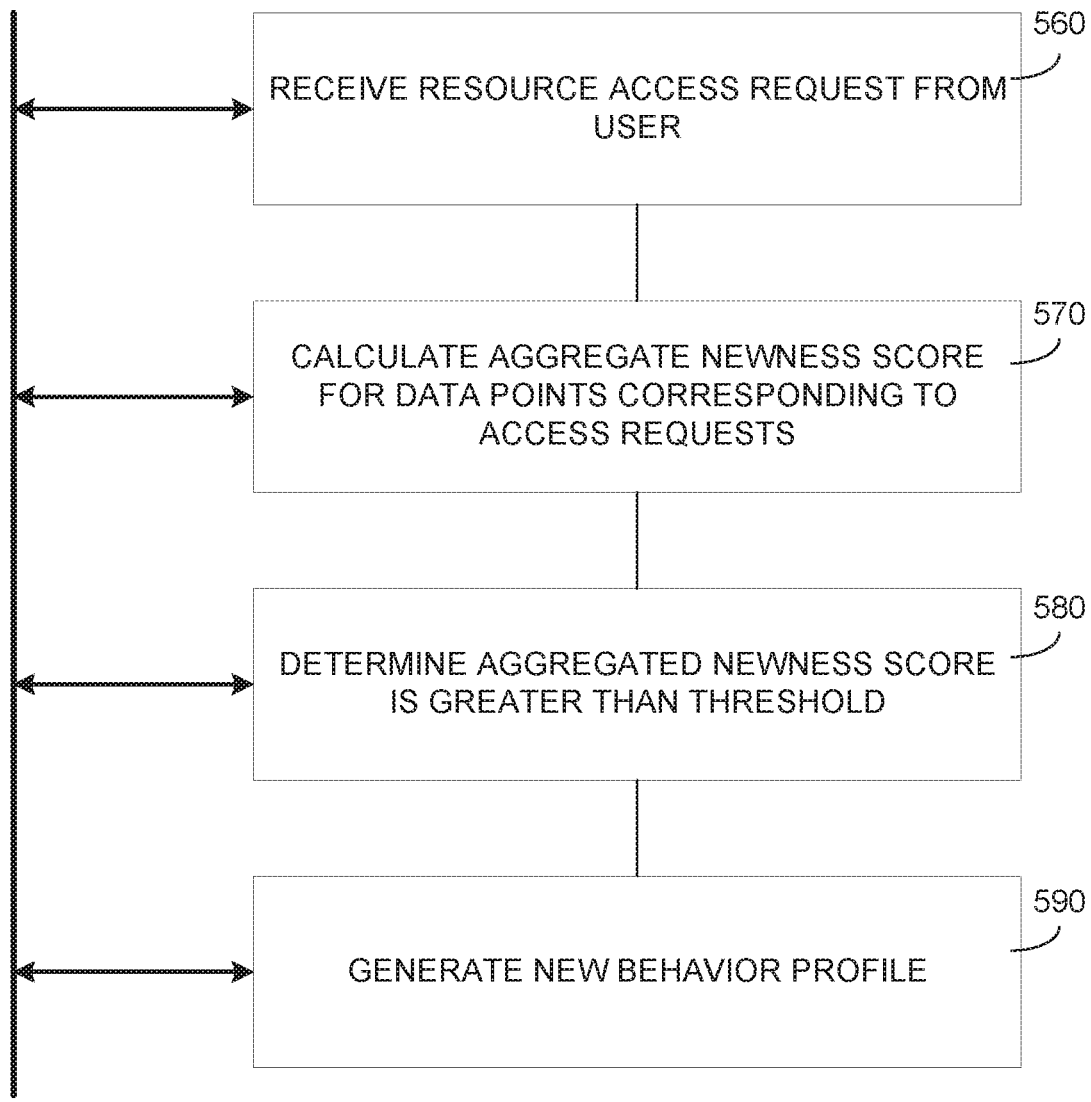
FIG. 5B illustrates a flow diagram of an example method of updating an existing behavior profile, according to example embodiments.

FIG. 5B illustrates a flow diagram 550 of an example method of updating an existing behavior profile, according to example embodiments. The method may include receiving a resource access request from a user 560. A computer receives a request to access a resource from a user of a client device via a network. After receiving the request to access the resource, the computer determines a data point corresponding to a context of the access request. In addition, the computer calculates a profile anomaly score and a cache anomaly score for the data point corresponding to the context of the access request.

An aggregate newness score is calculated for data points corresponding to access requests 570. The computer calculates a newness score for the data point corresponding to the context of the access request. Next, the computer aggregates newness scores for a plurality of data points corresponding to contexts of a plurality of access requests to form an aggregated newness score.

A determination is made if the aggregated newness score is greater than a threshold 580. Subsequent to generating the aggregated newness score for the plurality of data points, the computer makes a determination as to whether the aggregated newness score is greater than a pre-defined newness score threshold. If the computer determines that the aggregated newness score is less than the pre-defined newness score threshold, then the computer continues to receive requests to access resources.

Finally, a new behavior profile is generated 590. If the computer determines that the aggregated newness score is greater than or equal to the predefined newness score threshold, then the computer uses data points stored in a data point cache and a long-term storage to generate a new behavior profile for the user or update an existing behavior profile for the user.

Figure 6A:
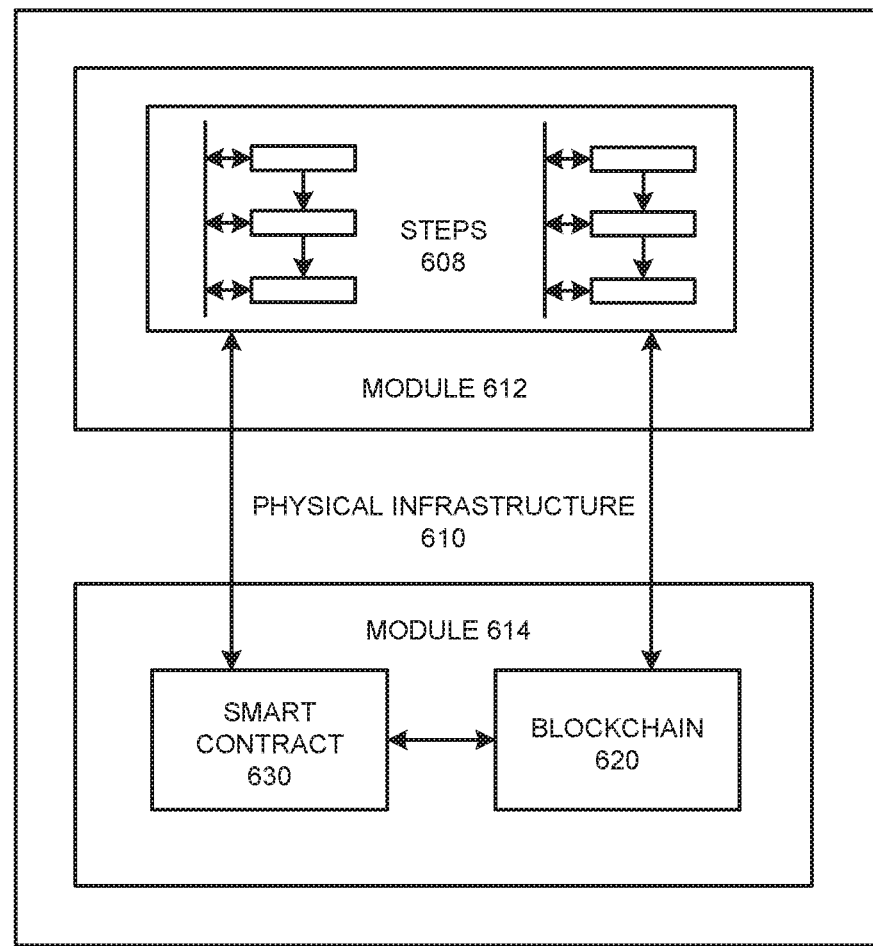
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
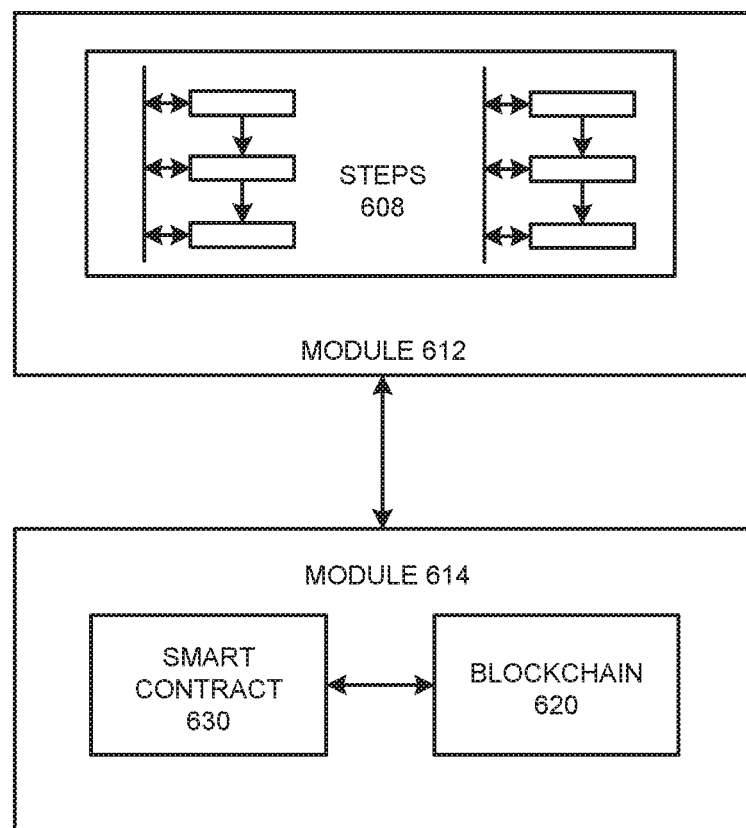
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
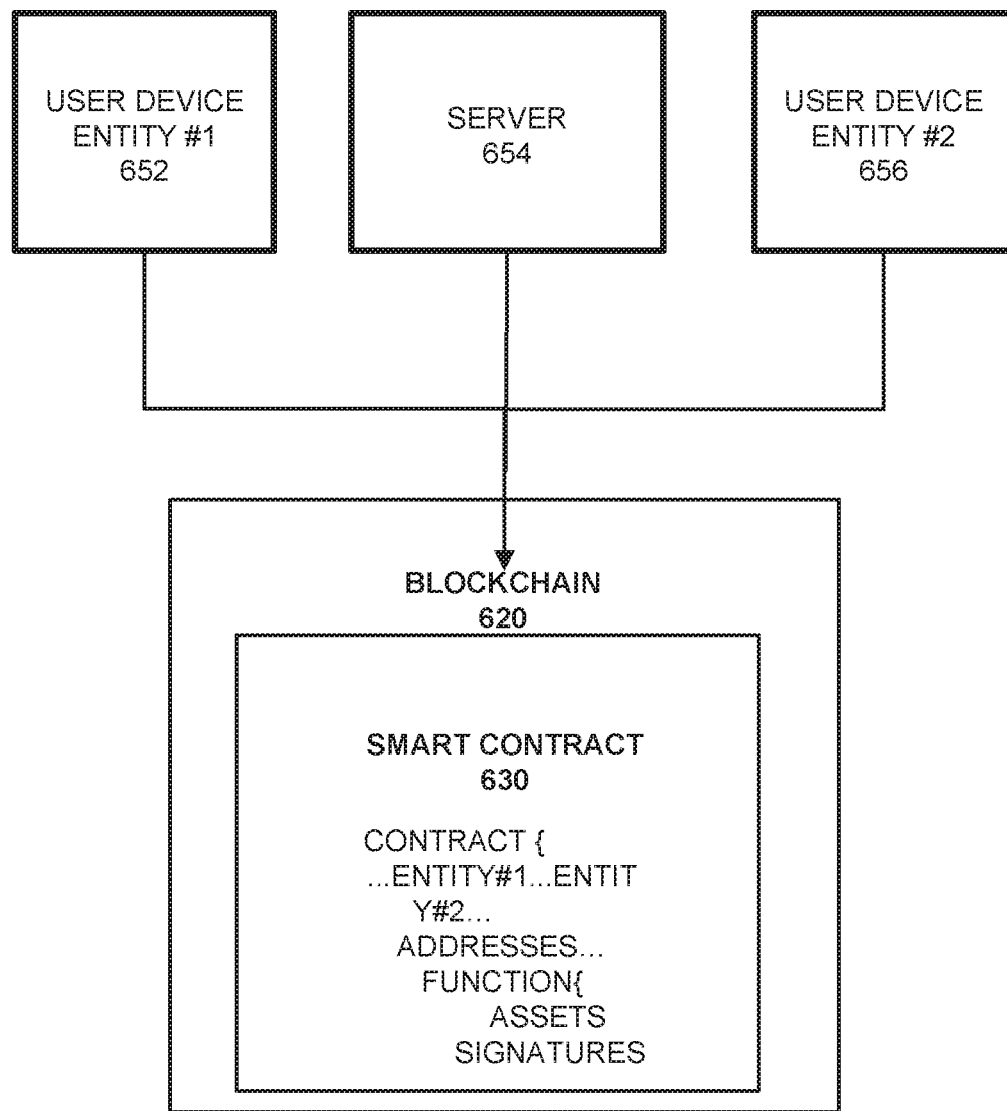
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
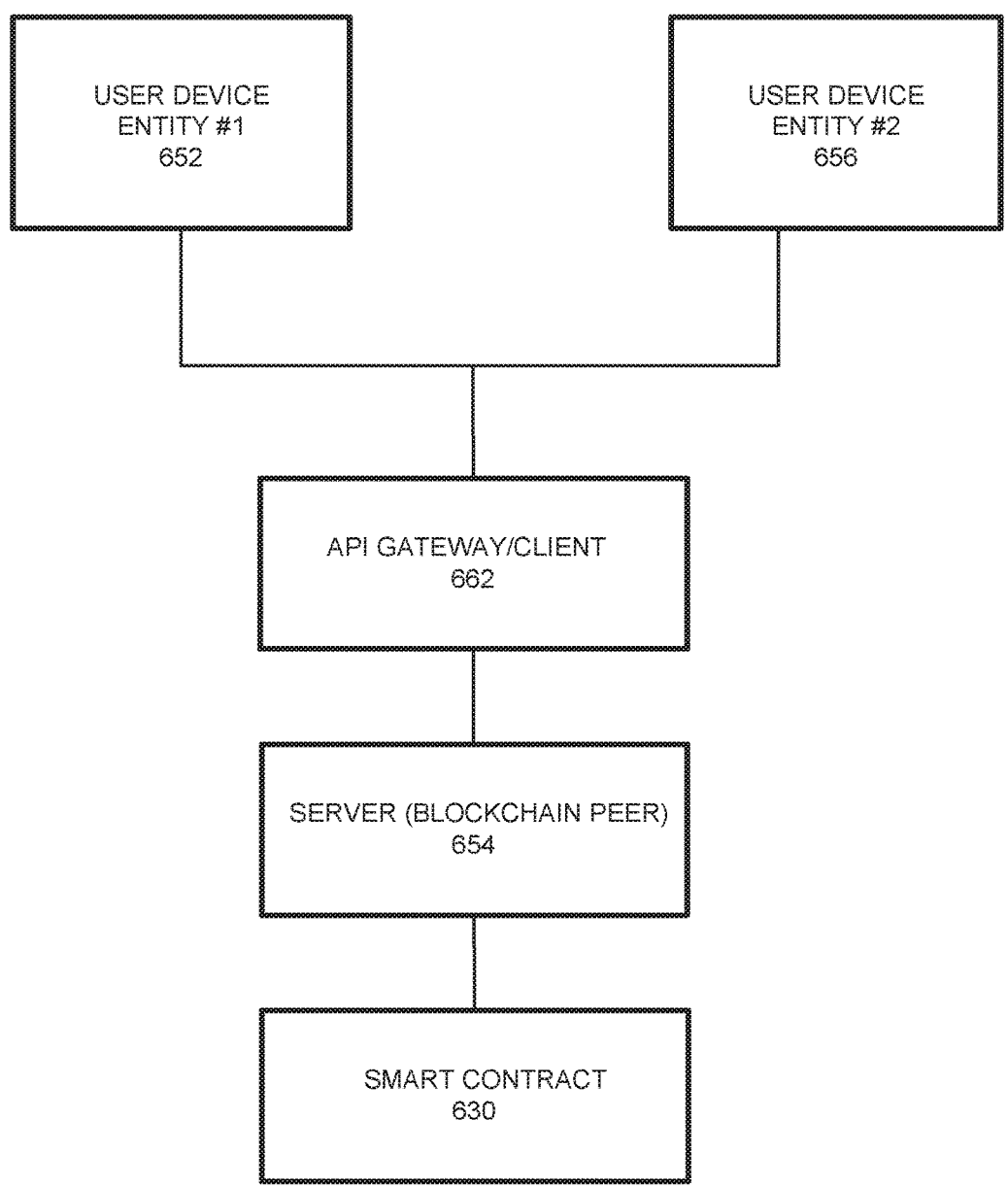
FIG. 6D illustrates an additional example system, according to example embodiments.

FIG. 6D illustrates a common interface 660 for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7A illustrates an example computer system architecture 700, which may represent or be integrated in any of the above-described components, etc.

Figure 7A:
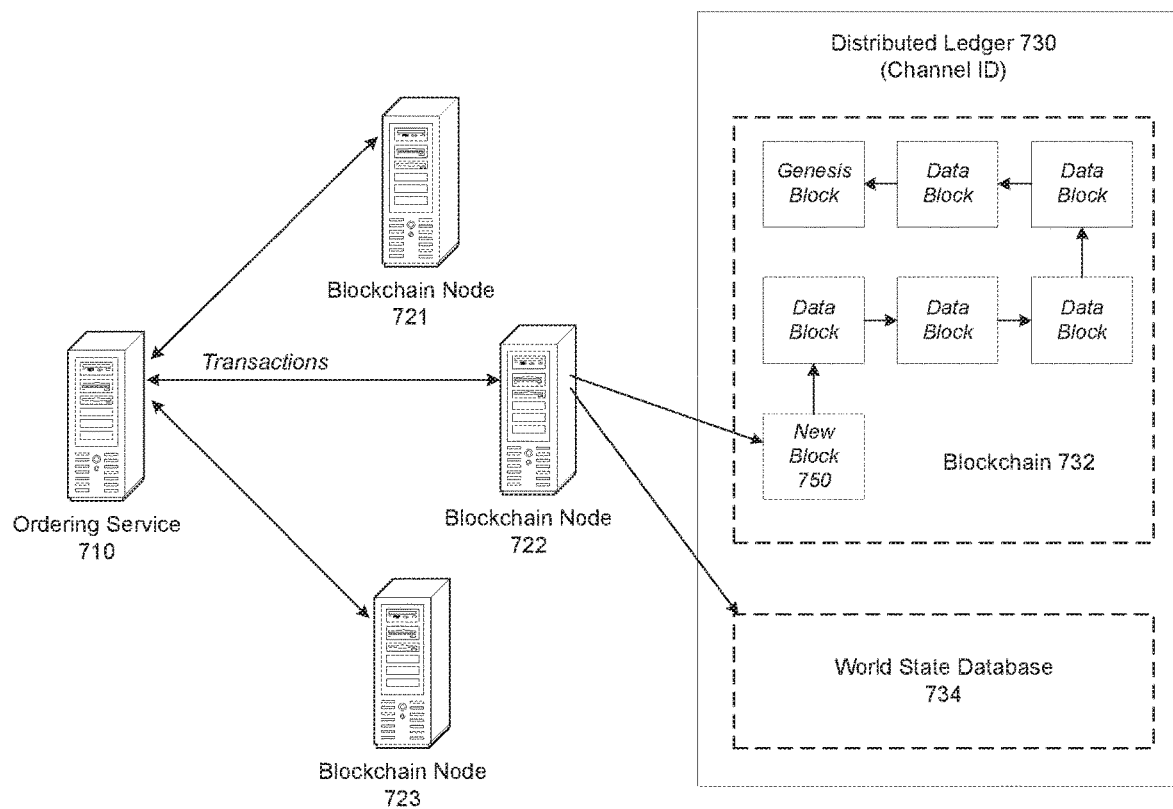
FIG. 7A illustrates a process of new data being added to a database, according to example embodiments.
Figure 7B:
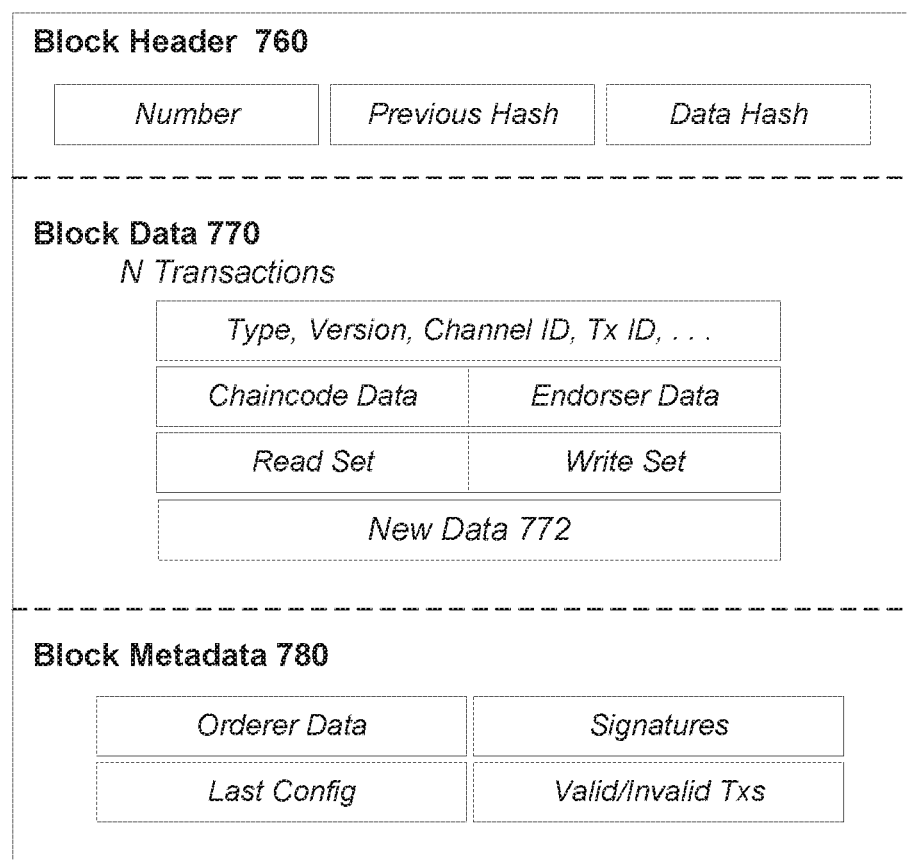
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes create a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 770 may also store data 772 which adds additional information to the hash-linked chain of blocks in the blockchain 732. For example, the data 772 may include the unique TXID (message identifier), the HMAC (hashed message authentication code), and the object identifier and the proposed update for a user preference update. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
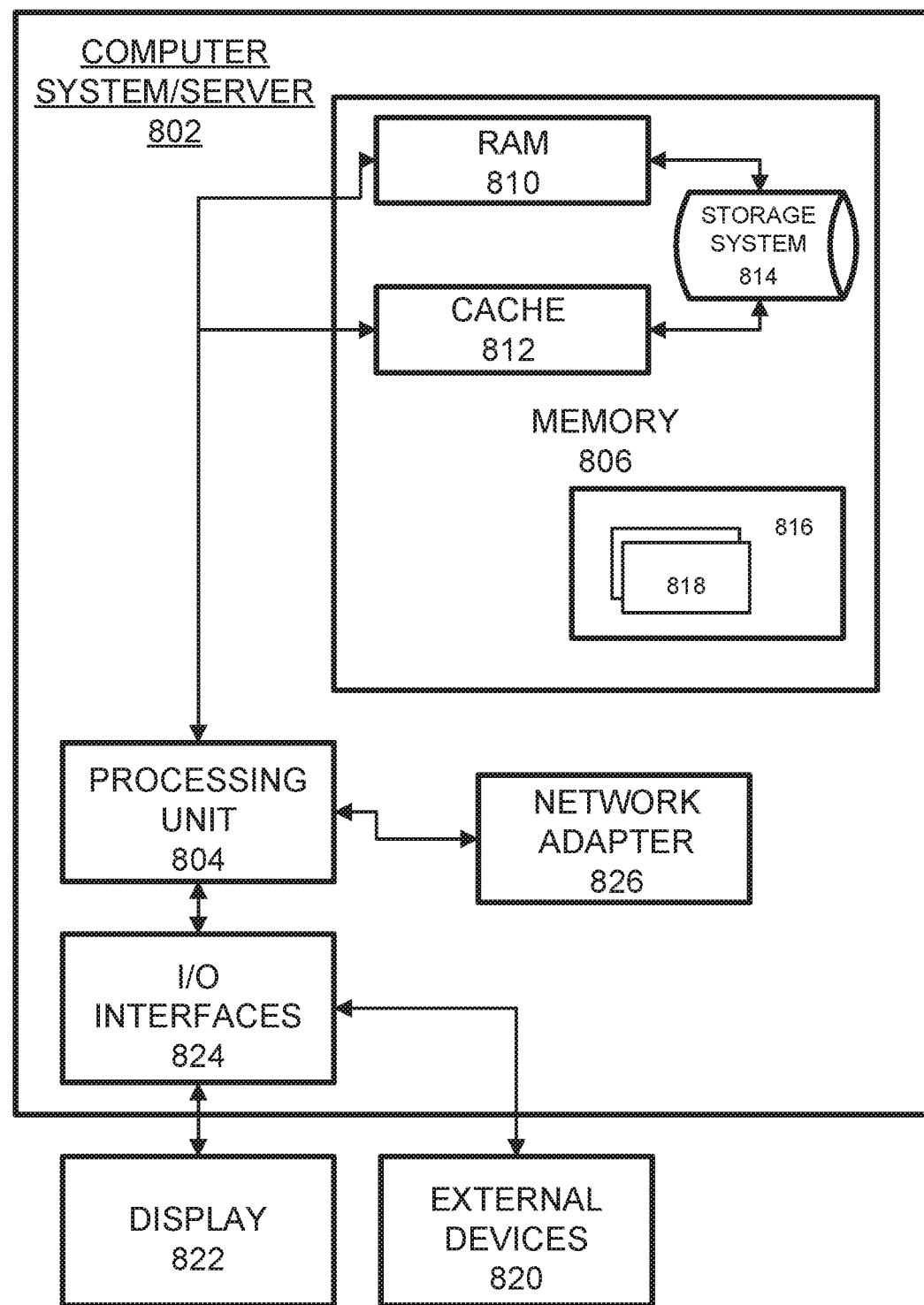
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smart phone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a blockchain network, comprising:
a first blockchain server, comprising:
a first memory configured to store historical sensor data and a shared ledger; and
a first hardware processor configured to receive first sensor updates from one or more sensors associated with the first blockchain server, and create a blockchain transaction to store updated action defaults and validated sensor updates that correspond to the first sensor updates to the shared ledger; and a second blockchain server, comprising:

a second memory configured to store the shared ledger, and a second hardware processor configured to receive second sensor updates from one or more sensors associated with the second blockchain server, read the shared ledger to determine updated action defaults and validated sensor updates that correspond to the second sensor updates, and interact with a device based on the updated action defaults and validated sensor updates that correspond to the second sensor updates.

2. The system of claim 1, wherein the first sensor updates and the second sensor updates each include one or more of user preferences, learned human behaviors, and physical characteristics.

3. The system of claim 2, wherein the first sensor updates include a hashed message authentication code and updated sensor information.

4. The system of claim 3, wherein the first hardware processor is configured to verify an authenticity of the first sensor updates.

5. The system of claim 1, wherein the first hardware processor is configured to determine if one or more action defaults should be updated based on the first sensor updates.

6. The system of claim 1, wherein the second blockchain server is licensed to have read access to the validated sensor updates that correspond to the first sensor updates.

7. A method, comprising:

receiving, by a first blockchain node of a blockchain network, first sensor updates from one or more sensors associated with the first blockchain node, the first blockchain node comprising a shared ledger and historical sensor data;

creating a blockchain transaction to store updated action defaults and validated sensor updates that correspond to the first sensor updates to the shared ledger;

receiving, by a second blockchain node of the blockchain network, second sensor updates from one or more sensors associated with the second blockchain node, the second blockchain node comprising the shared ledger;

reading the shared ledger to determine updated action defaults and validated sensor updates corresponding to the second sensor updates; and interacting with a device based on the updated action defaults and validated sensor updates that correspond to the second sensor updates.

8. The method of claim 7, wherein the first sensor updates and the second sensor updates each include one or more of user preferences, learned human behaviors, and physical characteristics.

9. The method of claim 8, wherein the first sensor updates include a hashed message authentication code and updated sensor information.

10. The method of claim 9, wherein the method further comprises verifying the authenticity of the first sensor updates via the first blockchain node.

11. The method of claim 7, wherein the method further comprises determining if one or more action defaults should be updated based on the first sensor updates.

12. The method of claim 7, wherein the second blockchain node is licensed to have read access to the validated sensor updates that correspond to the first sensor updates.

13. A non-transitory computer readable medium comprising instructions, that when executed by a processor, causes the processor to perform:

receiving, by a first blockchain node of a blockchain network, first sensor updates from one or more sensors associated with the first blockchain node, the first blockchain node comprising a shared ledger and historical sensor data;

creating a blockchain transaction to store updated action defaults and validated sensor updates that correspond to the first sensor updates to the shared ledger;

receiving, by a second blockchain node of the blockchain network, second sensor updates from one or more sensors associated with the second blockchain node, the second blockchain node comprising the shared ledger;

reading the shared ledger to determine updated action defaults and validated sensor updates corresponding to the second sensor updates; and interacting with a device based on the updated action defaults and validated sensor updates that correspond to the second sensor updates.

14. The non-transitory computer readable medium of claim 13, wherein the first sensor updates and second sensor updates each include one or more of user preferences, learned human behaviors, and physical characteristics.

15. The non-transitory computer readable medium of claim 14, wherein the processor is further configured to perform verifying the authenticity of the first sensor updates via the first blockchain node.

16. The non-transitory computer readable medium of claim 13, wherein the processor is further configured to perform determining if one or more action defaults should be updated based on the first sensor updates.

17. The non-transitory computer readable medium of claim 13, wherein the second blockchain node is licensed to have read access to the validated sensor updates that correspond to the first sensor updates.

* * * * *